United States Patent
Kokx (10) Patent No.: US 11,021,330 B2
(45) Date of Patent: Jun. 1, 2021

(54) ROLLER WITH NONLINEAR BORE HOLE IN A CONVEYOR SYSTEM

(71) Applicant: Laitram, L.L.C., Harahan, LA (US)

(72) Inventor: David A. Kokx, Hart, MI (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/634,960

(22) PCT Filed: Jul. 19, 2018

(86) PCT No.: PCT/US2018/042816
§ 371 (c)(1),
(2) Date: Jan. 29, 2020

(87) PCT Pub. No.: WO2019/032259
PCT Pub. Date: Feb. 14, 2019

(65) Prior Publication Data
US 2020/0207548 A1    Jul. 2, 2020

Related U.S. Application Data (60) Provisional application No. 62/542,918, filed on Aug. 9, 2017.

(51) Int. Cl.
*B65G 39/07* (2006.01)
*B65G 39/02* (2006.01)
*B65G 39/10* (2006.01)

(52) U.S. Cl.
CPC ............. *B65G 39/02* (2013.01); *B65G 39/07* (2013.01)

(58) Field of Classification Search
CPC ......... B65G 39/02; B65G 39/07; B65G 39/10
USPC ................. 198/780, 781.01, 781.02; 193/37
See application file for complete search history.

(56) References Cited

U.S. PATENT DOCUMENTS

| | | | |
|---|---|---|---|
| 752,329 A * | 2/1904 | Clegg | |
| 4,059,180 A * | 11/1977 | Krivec | B65G 39/09 193/37 |
| 4,260,387 A * | 4/1981 | Muellenberg | B65G 23/04 384/280 |
| 4,473,221 A * | 9/1984 | Arai | B65H 3/0638 226/190 |
| 4,496,257 A * | 1/1985 | Habelt | B41J 13/076 118/DIG. 15 |
| 5,117,970 A * | 6/1992 | Gibbs | B65G 39/07 198/808 |
| 5,217,099 A * | 6/1993 | Marcus | H01M 2/1077 193/37 |
| 6,148,991 A * | 11/2000 | Meishner | B65G 47/263 198/780 |

(Continued)

FOREIGN PATENT DOCUMENTS

| JP | 02-013417 Y2 | 4/1990 |
|---|---|---|
| JP | 10-013091 A | 1/1998 |
| JP | 2008-058420 A | 3/2008 |

*Primary Examiner* — Douglas A Hess
(74) *Attorney, Agent, or Firm* — Catherine M. Bishop (57) ABSTRACT

A roller for a conveyor system comprises a nonlinear bore hole to facilitate retention of the roller on a roller-receiving portion of a corresponding shaft. A nonlinear bore hole comprises a central cylindrical portion for receiving a roller-receiving portion of the shaft and unaligned slots in communication with the central cylindrical portion to prevent migration of the roller from the roller-receiving portion.

9 Claims, 11 Drawing Sheets

(56) References Cited

U.S. PATENT DOCUMENTS

| | | | | |
|---|---|---|---|---|
| 6,671,958 B2* | 1/2004 | Savolainen | ............... | D21F 1/40 |
| | | | | 29/527.3 |
| 7,568,574 B2* | 8/2009 | Nagatomo | ........ | H01L 21/67784 |
| | | | | 198/493 |
| 7,798,312 B2* | 9/2010 | Brumm | .................. | B65H 31/30 |
| | | | | 198/779 |
| 8,035,273 B2* | 10/2011 | Ionel | ........................ | H02K 1/22 |
| | | | | 310/261.1 |
| 8,206,277 B2* | 6/2012 | Sutton | .................... | B65H 27/00 |
| | | | | 492/7 |
| 8,646,595 B2* | 2/2014 | Miller | .................... | B65G 17/40 |
| | | | | 198/779 |
| 8,903,289 B2* | 12/2014 | Yu | ......................... | B65H 20/08 |
| | | | | 399/313 |
| 9,056,727 B2* | 6/2015 | White | .................... | B65G 39/12 |
| 2006/0071421 A1 | 4/2006 | Itoh | | |
| 2013/0051865 A1 | 2/2013 | Kotani et al. | | |

\* cited by examiner

ROLLER WITH NONLINEAR BORE HOLE IN A CONVEYOR SYSTEM

BACKGROUND OF THE INVENTION

The invention relates generally to power-driven conveyors and, more particularly, to support rollers and other accessories used in a conveyor system.

Endless conveyor belts are widely used in many industries to move, sort, carry, store or process items. Conveyor belts are generally trained around a drive, such as a sprocket, and one or more idler rollers to form a circuit or loop comprising an infeed, upper carryway, outfeed and a lower returnway. Articles are conveyed atop the conveyor belt supported along an upper carryway. The conveyor belt returns along a lower returnway. To minimize the maximum sag of the belt in the returnway, supports, such as return shoes or rollers, are often used. A common returnway support includes a set of doughnut-shaped rollers mounted for free rotation on a round shaft. Because the rollers are free to rotate, they produce lower friction in contact with the belt than do static supports, such as shoes. But one problem associated with the returnway rollers is their tendency over time to migrate axially along the shaft under the influence of forces from the belt. Migration of the doughnut rollers can cause belt misalignment and noise.

Conventionally, rollers, such as returnway rollers, have a central, cylindrical bore hole for mounting the roller on a round shaft or axle having a diameter that is slightly smaller than the diameter of the cylindrical bore hole. Various schemes have been used to prevent rollers from migrating along the shaft. Shaft clamps and hose clamps are effective, but are expensive and labor-intensive to install. Duct tape on the shaft flanking the doughnut rollers can be effective, but is not aesthetically pleasing. Spring-tension clips, like those used to connect the clevis at the bottom of the lift rod to the pivot rod of the stopper in a bathroom sink, have also been used. But lateral pressure by a doughnut roller against such a spring-tension clip with its outwardly bent arms tends to release the bite of the dip on the shaft and allow the roller to push the dip along the shaft.

SUMMARY OF THE INVENTION

A support roller for a conveyor belt comprises a nonlinear bore hole for mounting the support roller on a shaft. The nonlinear bore hole is designed to constrain the support roller to an operational portion of the shaft.

According to one aspect, a roller for a conveyor comprises an annular body having a first face, a second face and a peripheral outer surface and a nonlinear bore hole extending through the annular body from the first face to the second face for receiving a shaft.

According to another aspect, a roller for a conveyor comprises an annular body having a first face, a second face and a peripheral outer surface and a bore hole comprising a central cylindrical portion extending from the first face to the second face, a first slot in communication with the central cylindrical portion and the first face, and a second slot in communication with the central cylindrical portion and the second face, the second slot unaligned with the first slot.

According to another aspect, a combination roller and shaft comprises a shaft having a roller-receiving portion and a main portion and a roller comprising a nonlinear bore hole mounted on the roller-receiving portion.

BRIEF DESCRIPTION OF THE DRAWINGS

The disclosed systems and methods can be understood with reference to the following drawings. The components in the drawings are not necessarily to scale.

FIGS. 15-20 show the steps involved in mounting the roller of FIG. 12 on a shaft according to an embodiment of the invention;

DETAILED DESCRIPTION OF THE INVENTION

A conveyor employs a roller having a bore hole designed to self-retain the roller on a selected portion of a shaft. The invention is be described relative to certain illustrative embodiments, though the invention is not limited to these embodiments.

Figure 1:
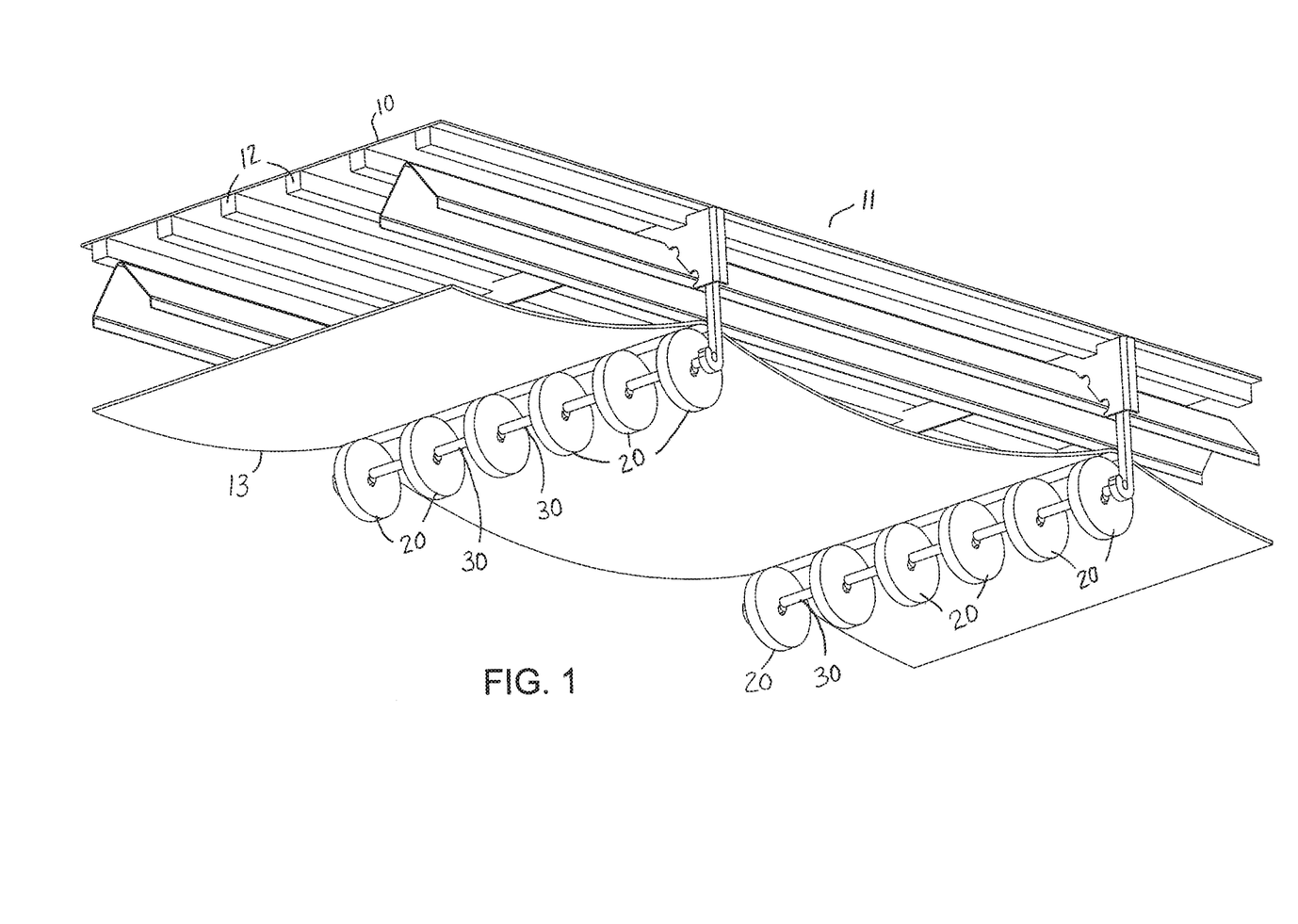
FIG. 1 is an isometric view of a returnway of a conveyor including rollers having nonlinear bore holes according to an embodiment of the invention.

FIG. 1 is an isometric view of a returnway of a conveyor including rollers supporting a conveyor belt, the rollers having nonlinear bore holes to facilitate retention of each roller on a shaft. The conveyor belt 10 forms a carryway 11 traveling on carryway rails 12 and a returnway 13 below the carryway in which the conveyor belt is supported by returnway support rollers 20 mounted on a shaft 30. The shaft 30 is connected to a frame and may be rotationally fixed, while the support rollers rotate freely on the shaft. The shaft 30 and returnway support rollers 20 are configured to constrain the returnway support rollers 20 to select sections of the shaft 30. Various embodiments of a self-retaining returnway support roller 30 are described below, though the invention is not limited to these embodiments. In addition, the invention is not limited to rollers in a returnway of a conveyor, but can apply to any roller that is rotationally mounted on a shaft.

Figure 2:
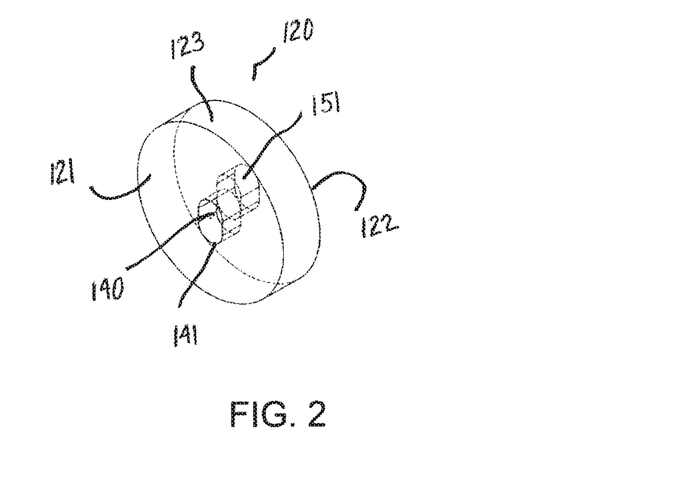
FIG. 2 shows an embodiment of a conveyor roller having a nonlinear bore hole according to an embodiment of the invention.
Figure 3:
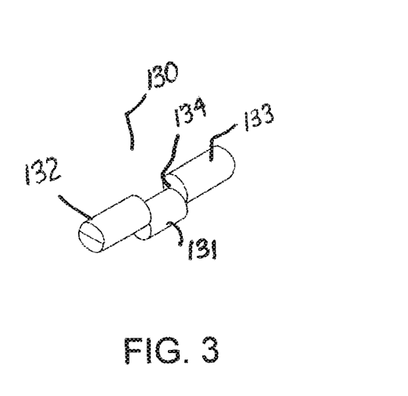
FIG. 3 shows a conveyor shaft suitable for use with the conveyor roller of FIG. 2.

FIG. 2 shows an embodiment of a roller 120 having a nonlinear bore hole 140 to retain the axial position of the roller on a shaft. The illustrative roller 120 is a returnway support roller in a conveyor, but the invention is not so limited, and can comprise any roller used in a conveying system. FIG. 3 shows a shaft 130 suitable for use with the roller 120.

The illustrative roller 120 has a disc portion comprising a first circular face 121, a second circular face 122 and a peripheral outer surface 123 between the two faces 121, 122. The illustrative nonlinear bore hole 140 comprises two offset, overlapping slots 141, 151. The first slot 141 is formed in the first face 121 and the second slot is formed in the second face 122.

Figure 4:
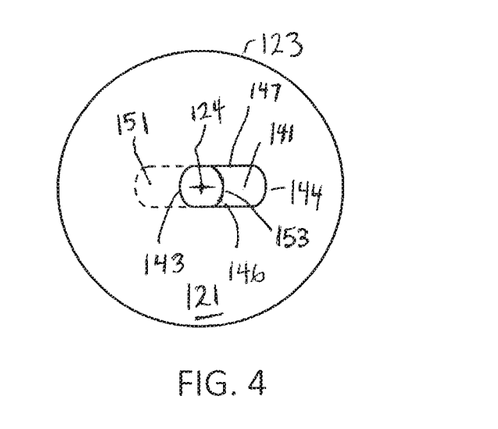
FIG. 4 is a front view of the conveyor roller of FIG. 2.

As shown in FIG. 4, the first slot 141 of the roller 120 is a rounded slot, having the shape of a stadium, though the invention is not so limited. The slot 141 is formed by a first curved wall 143 having a center of curvature that coincides with the central axis 124 of the disc portion. The slot 141 extends towards the peripheral outer surface 123 and terminates in a second curved wall 144, with straight walls 146, 147 connecting the curved end walls 143, 144.

The second slot 151 is formed in the second face 122. The second slot 151 also takes the form of a stadium, with a portion overlapping the first slot 141 to form a cylindrical opening extending from the first face 121 to the second face 122. A first curved surface 153 of the second slot also has a center of curvature coinciding with the central axis 124 of the disc portion. The second slot 151 extends out towards the peripheral portion 123. The second slot 151 is 180° out of phase with the first slot 141.

Figure 5:
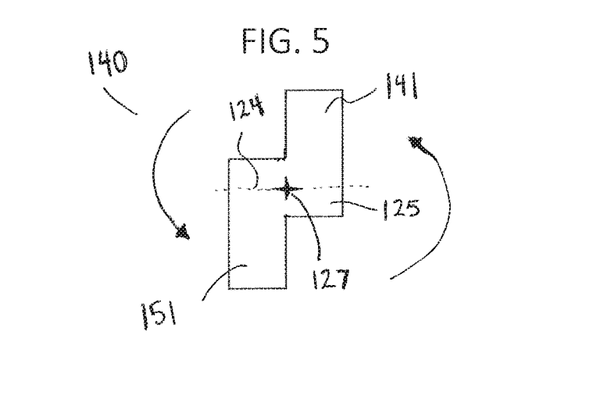
FIG. 5 is a side view showing the shape of the nonlinear bore hole of the roller of FIG. 2.

Referring to FIG. 5, the illustrative nonlinear bore hole 140 extending from the first face to the second face can be described as having a central cylindrical opening 125 having a consistent cross section (the portion where the slots overlap) and two offset slots (portions of 141, 151 that do not form part of the central cylindrical opening 125) extending from the central cylindrical opening. The central cylindrical opening 125 extends from the first face 121 to the second face 122 along axis 124.

The illustrative nonlinear bore hole 140 has an overall shape that is rotationally symmetric. As shown in FIG. 5, the bore hole 140 is rotationally symmetric about an axis 127 that is halfway between the two faces 121, 122 and is at the geometric center of the disc. The axis 127 extends perpendicular to the axis 124 of the disc. The nonlinear bore hole 140 is rotationally symmetric about the axis 127 by a factor of 2. Rotation of the shape about the axis 127 by 180° results in the same shape.

Referring back to FIG. 2, the shaft 130 comprises a roller-receiving portion 131 and offset portions 132, 133. The offset portions 132, 133 form crescent-shaped walls 134 aside the roller-receiving portion 131.

Figure 6:
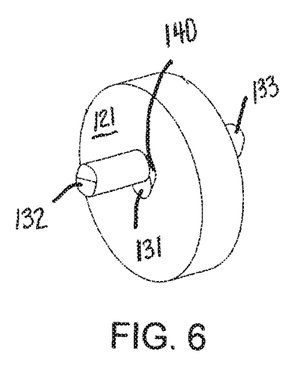
FIG. 6 shows the roller of FIG. 2 in an operational position mounted on the shaft of FIG. 3.
Figure 7:
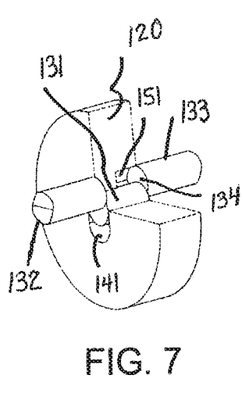
FIGS. 7-11 show the steps involved in removing the roller of FIG. 6 from the shaft of FIG. 6.

FIG. 6 shows the roller 120 mounted on the shaft 130 via the nonlinear bore hole 140. The roller-receiving portion 131 extends through the central cylindrical opening 125, with the crescent-shaped walls 134 adjacent the roller faces 121, 122 to prevent or reduce or limit axial movement of the roller 120 on the shaft 130. The roller 120 can rotate freely on the roller-receiving portion 131 of the shaft.

Figure 8:
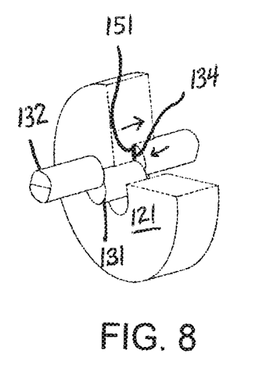
Figure 9:
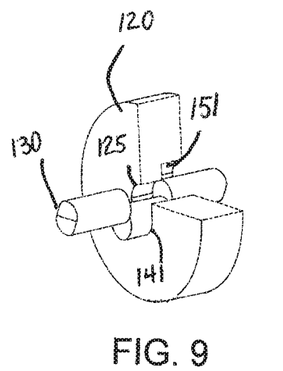
Figure 10:
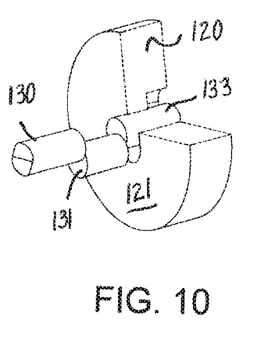
Figure 11:
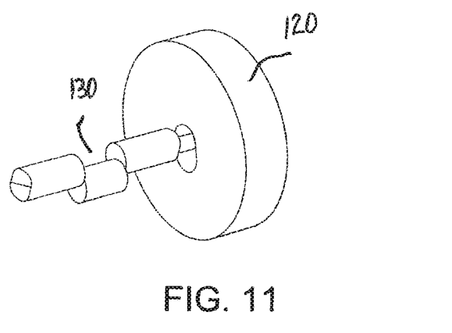
Figure 12:
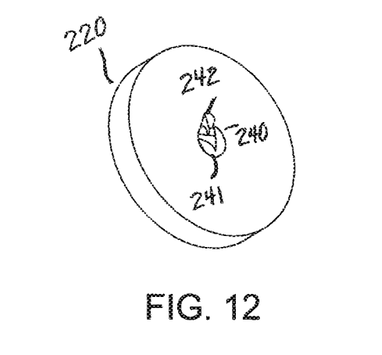
FIG. 12 is an isometric view of a conveyor roller having a nonlinear bore hole according to another embodiment of the invention.
Figure 13:
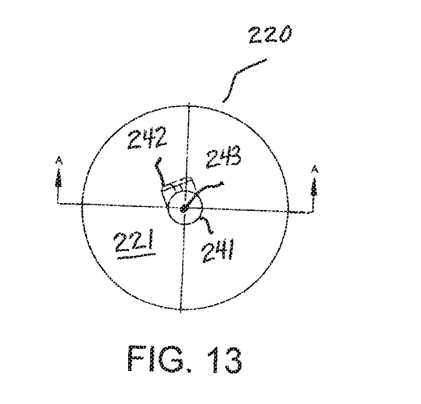
FIG. 13 is a front view of the roller of FIG. 12.
Figure 14:
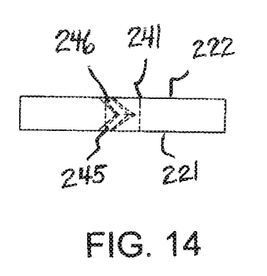
FIG. 14 is a top view of the roller of FIG. 12.
Figure 15:
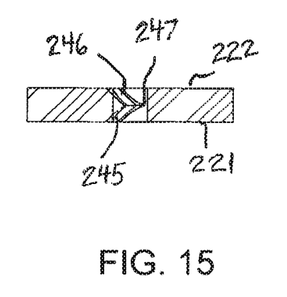
FIG. 15 is a cross-sectional view of the roller of FIG. 12 through line A-A.

FIGS. 7-11 show the steps for removing the roller 120 from the shaft 130. In FIGS. 7-10, a 90° segment of the roller 120 has been removed for demonstration purposes. First, the offset portion 133 of the shaft 130 is aligned with the peripherally outer portion of the slot 151, while the roller-receiving portion 131 remains in the cylindrical portion. Then, as shown in FIG. 8, the offset portion 133 is pushed through the second slot 151 until the wall 134 abuts the inner surface of the slot, causing the roller-receiving portion 131 to emerge from the first face 121. Next, as shown in FIG. 9, the shaft 130 is shifted down in the bore hole 140, so that the roller-receiving portion 131 is seated in the peripheral outer portion of the slot 141 and the offset portion is in the central cylindrical opening 125. Then, as shown in FIG. 10, the portions 131 and 133 can be pulled out of the bore hole 140, and as shown in FIG. 11, the roller 120 removed entirely from the shaft 130. The nonlinear shape of the bore hole 140 and the nonlinear shape of the shaft 130 cooperate to prevent removal of the roller 120 from the shaft 130 during normal operation, while allowing rotation of the roller on the roller-receiving portion 131 of the shaft.

FIGS. 12-15 illustrate another embodiment of a roller 220 having a nonlinear bore hole 240 to constrain the roller on an operational portion of a shaft. The roller 220 comprises an annular disc having a first face, an opposite second face and a peripheral outer surface. The nonlinear bore hole 240 comprises a central cylindrical portion 241 configured to seat a rotation portion of a shaft and a nonlinear track portion 242 in communication with the central cylindrical portion. Both the central cylindrical portion 241 and the nonlinear track portion 242 extend from the first face to the opposite second face. Similar to the central cylindrical opening 125, the central cylindrical portion 241 extends along a central axis 243 about which the roller 220 rotates.

The illustrative nonlinear track portion 242 is a v-shaped slot having a first leg 245 that extends transversely from a first roller face 221 towards the axial center of the roller. A second leg 246 extends transversely from the second roller face 222 towards the axial center of the roller (halfway between the first roller face 221 and the second roller face 222). The nonlinear track 242 has mirror image symmetry about the axial center of the roller, though the invention is not limited.

While the illustrative track portion is v-shaped, formed by two transverse legs or slots converging at a nadir 247, the invention is not so limited. For example, the track could be U-shaped, W-shaped, or S-shaped, or have another suitable shape that allows constraint of the roller on a shaft. Alternatively, the track portion 242 can lack mirror image symmetry and-or rotational symmetry, but is otherwise configured to constrain a roller on a select portion of a shaft.

FIGS. 16-20 show the steps of mounting the roller 220 on a shaft 230 configured to constrain the roller according to an embodiment of the invention. The shaft 230 includes a main body configured to be received in the central cylindrical portion 241 of the roller 220 and protrusions 232, 233 that are spaced apart by slightly more (L++) than the axial length L of the roller 220.

Figure 16:
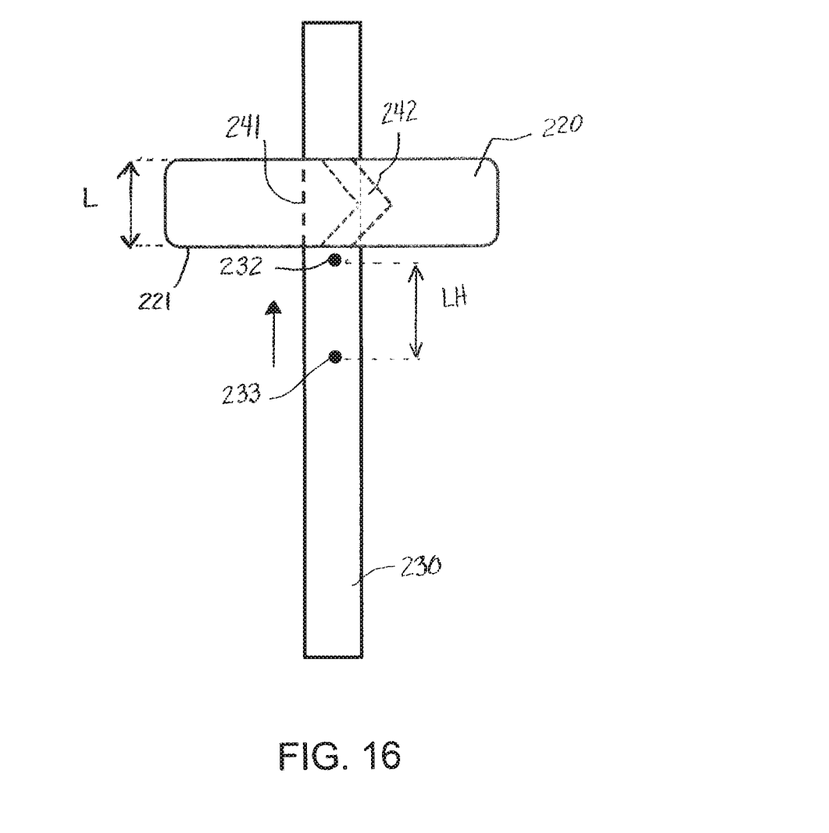
Figure 17:
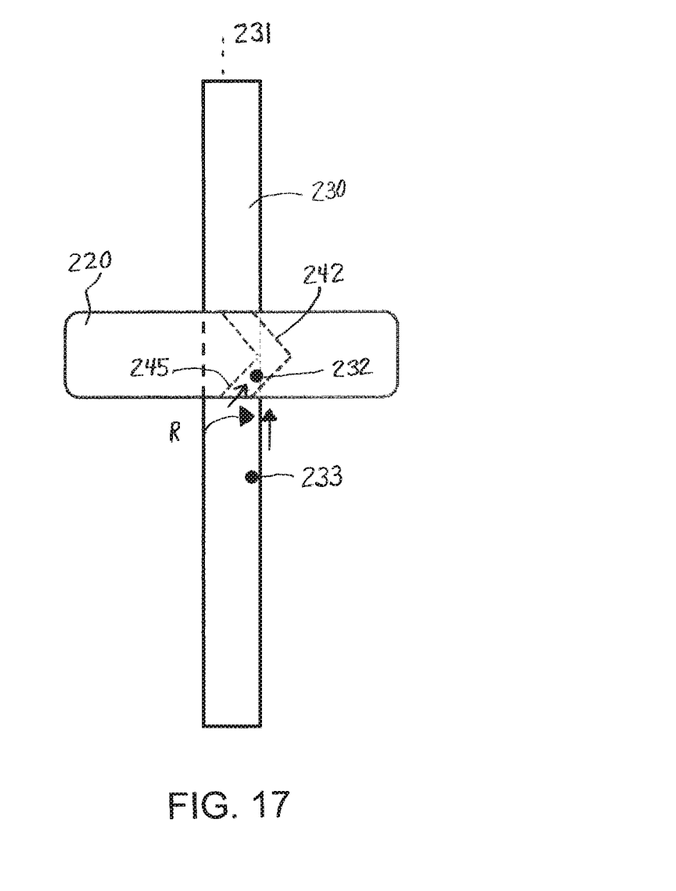
Figure 18:
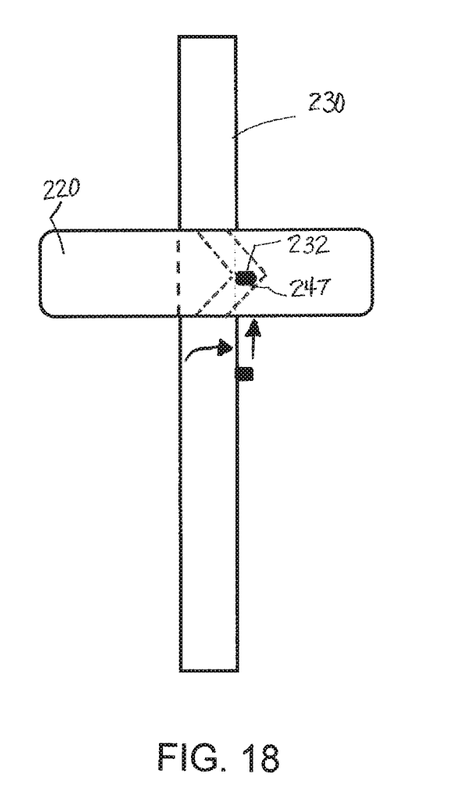
Figure 19:
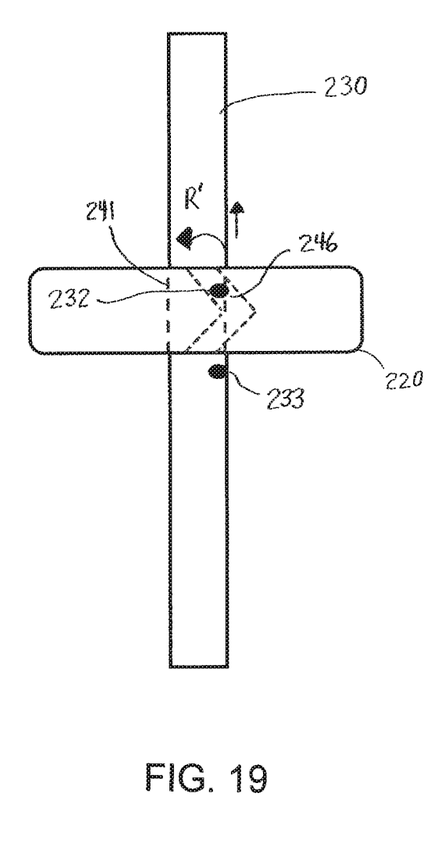
Figure 20:
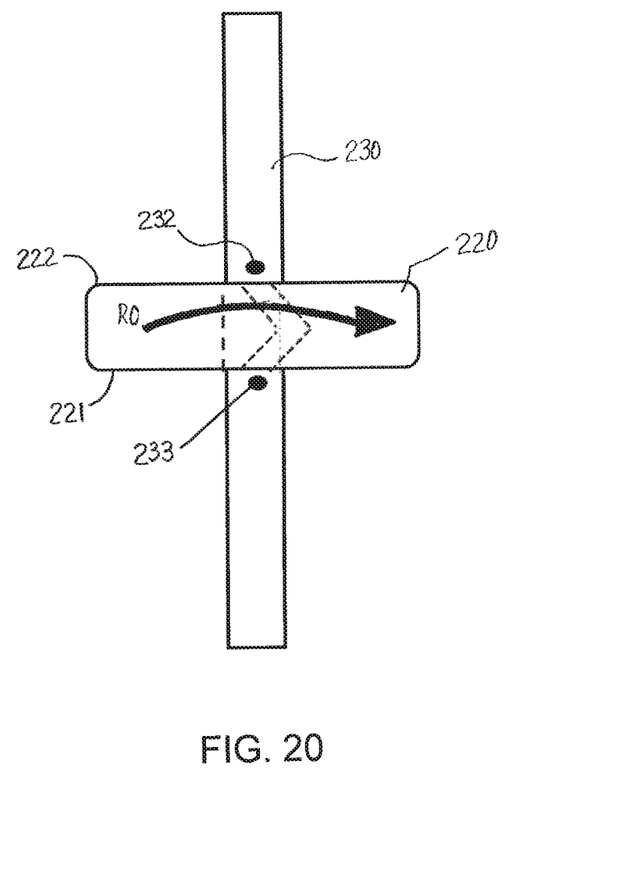

In FIG. 16, the shaft 230 is pushed through the bore hole 240 until a first protrusion 232 abuts the first face 221. The protrusion 232 is placed adjacent the opening to the track 242. The shaft 230 is continued to push forward until the protrusion 232 enters the track 242. As shown in FIG. 17, the shaft 230 is rotated in direction R about its central axis 231 while continuing to push forward, causing the protrusion 232 to enter into and travel down the first leg 245 of the track 242. The protrusion 232 continues to travel down the track with pushing and twisting of the shaft until it bottoms out at the nadir 247, as shown in FIG. 18. Then, the shaft is rotated in an opposite direction R', while continuing to push the shaft through the opening 241, causing the protrusion 232 to enter the second leg 246 of the track. The shaft 230 continues to rotate and push through the bore hole until the first protrusion 232 emerges from the second leg 246, as shown in FIG. 20. In FIG. 20, the roller 220 is fully mounted on the operational portion of the shaft 230, i.e., the portion between protrusions 232, 233. In this position, the protrusions 232, 233 straddle the roller, abutting faces 222, 221, respectively, while allowing the roller to freely rotate on that roller-receiving portion.

When the roller 220 rotates in an operational direction Ro, the roller 220 is constrained between the two protrusions 232, 233 by the configuration of the nonlinear bore hole 240. The transverse direction of the legs 245, 246 in the track 245 prevents the roller from migrating from the operational portion of the shaft, as the protrusions 232, 233 cannot enter the track 245 when the roller rotates in the operational direction Ro. However, rotation of the roller in the opposite direction, combined with pushing or pulling of the shaft in the axial direction may allow one of the protrusions 232, 233 to enter the track 245, intentionally dislocating the roller from its operational position on the roller-receiving portion of the shaft between the two protrusions 232, 233.

Figure 21:
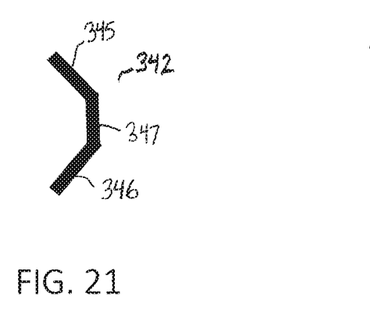
FIGS. 21-24 show various examples of a nonlinear track portions for a roller having a nonlinear bore hole according to alternate embodiments of the invention.
Figure 22:
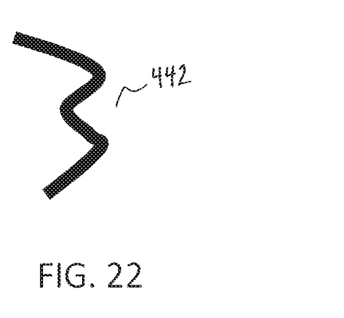
Figure 23:
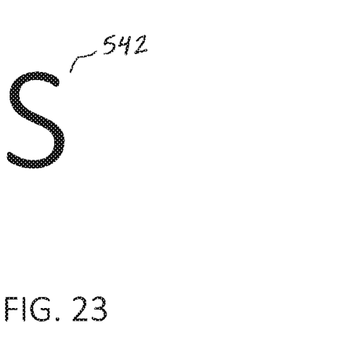
Figure 24:
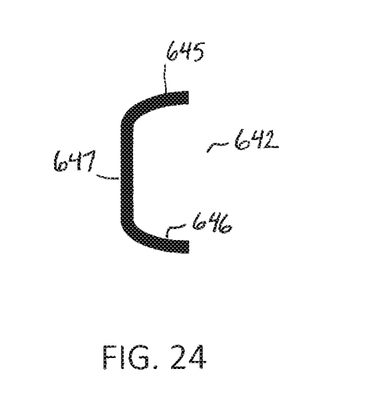

As described above, the nonlinear track of the roller bore hole can have any suitable embodiment suitable for constraining a roller during operation. For example, in one embodiment only one or both end portion of the track that abut a roller face is—are transverse, with an interior portion of the track straight, transverse, rounded or otherwise configured. FIGS. 21-24 show various alternative embodiments of a nonlinear track portion forming a portion of a nonlinear bore hole in a roller suitable for constraining the roller to an operational portion of a shaft, though the invention is not limited to these embodiments. For example, as shown in FIG. 21, a nonlinear track 342 of a roller bore hole can include two transverse legs 345, 346 and a central straight portion 347. Another nonlimiting embodiment in FIG. 22 shows a nonlinear track 442 having various transverse portions connected by curves, without requiring mirror image or rotational symmetry. FIG. 23 shows an S-shaped nonlinear track portion 542 of a roller bore hole according to another embodiment of the invention. FIG. 24 shows an exemplary nonlinear track portion 642 of a roller bore hole comprising a central straight portion 647 and two curved end portions 645, 646 extending from front and rear faces of the roller to the central straight portion. Various other embodiments of nonlinear bore holes can be used to provide a self-retaining roller.

Although the invention has been described in detail with respect to an exemplary version, other versions are possible. So, as these few examples suggest, the scope of the claims is not meant to be limited to the exemplary embodiments described in detail.

What is claimed is:

1. A roller for a conveyor, comprising:
   an annular body having a first face, a second face and a peripheral outer surface; and
   a central cylindrical opening extending through and along a central axis of the annular body from the first face to the second face for receiving a cylindrical shaft, and
   a nonlinear track in communication with the central cylindrical opening, the nonlinear track comprising a first transverse leg extending from the first face towards the second face and in communication with the central cylindrical opening and a second transverse leg extending from the second face towards the first face and in communication with the central cylindrical opening.

2. The roller of claim 1, wherein the nonlinear track is v-shaped.

3. The roller of claim 1, wherein the nonlinear track has mirror image symmetry.

4. A roller for a conveyor, comprising:
   an annular body having a first face, a second face and a peripheral outer surface; and
   a bore hole extending from the first face to the second face, the bore hole comprising a stadium-shaped first slot formed in the first face having a first curved end with a center of curvature that coincides with a central axis of the annular body, a second curved end near the peripheral outer surface and straight side walls connecting the first curved end and second curved end, the bore hole further comprising a stadium-shaped second slot formed in the second face, wherein the second slot has a first curved end having a center of curvature that coincides with the central axis of the annular body the second slot overlapping and 180° out of phase with the first slot to form a cylindrical opening extending from the first face to the second face.

5. The roller of claim 4, wherein the bore hole is rotationally symmetric about an axis that is halfway between the first face and the second face and is at the geometric center of the disc.

6. A combination roller and shaft, comprising:
   a cylindrical shaft having a roller-receiving portion between a first protrusion and a second protrusion and a main portion;
   a roller comprising an annular disc having a first face, an opposite second face, a peripheral outer surface and a nonlinear bore hole mounted on the roller-receiving portion, the nonlinear bore hole comprising a central cylindrical portion extending from the first face to the second face and a nonlinear track portion for receiving the first protrusion, the nonlinear track portion comprising a first transverse leg extending transversely from the first face towards an axial center of the roller and a second transverse leg extending transversely from the second face towards the axial center of the roller.

7. The combination roller and shaft of claim 6, wherein the first protrusion is spaced from the second protrusion by a distance that is slightly more than an axial length of the roller.

8. The combination roller and shaft of claim 6, wherein the first and second transverse legs converge at the axial center of roller.

9. The combination roller and shaft of claim 6, wherein the first protrusion abuts the first face of the roller and the second protrusion abuts the second face of the roller.

* * * * *